United States Patent
Wang

(10) Patent No.: US 11,789,603 B2
(45) Date of Patent: Oct. 17, 2023

(54) FILE PROCESSING METHOD, TERMINAL, AND STORAGE MEDIUM

(71) Applicant: GUANGDONG OPPO MOBILE TELECOMMUNICATIONS CORP., LTD., Guangdong (CN)

(72) Inventor: Xiao Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/730,082

(22) Filed: Apr. 26, 2022

(65) Prior Publication Data

US 2022/0253187 A1    Aug. 11, 2022

Related U.S. Application Data

(63) Continuation of application No. 17/375,891, filed on Jul. 14, 2021, now Pat. No. 11,347,389, which is a continuation of application No. PCT/CN2020/071654, filed on Jan. 13, 2020.

(30) Foreign Application Priority Data

Jan. 15, 2019    (CN) .......................... 201910036779.5

(51) Int. Cl.
| | | |
|---|---|---|
| *G06F 3/0486* | (2013.01) | |
| *G06F 9/451* | (2018.01) | |
| *G06F 1/16* | (2006.01) | |
| *G06F 3/04817* | (2022.01) | |
| *G06F 3/04883* | (2022.01) | |

(52) U.S. Cl.
CPC .......... *G06F 3/0486* (2013.01); *G06F 1/1641* (2013.01); *G06F 3/04817* (2013.01); *G06F 3/04883* (2013.01); *G06F 9/451* (2018.02)

(58) Field of Classification Search
CPC . G06F 3/0486; G06F 3/04883; G06F 3/04817
See application file for complete search history.

(56) References Cited

U.S. PATENT DOCUMENTS

| | | | | |
|---|---|---|---|---|
| 8,966,386 B2* | 2/2015 | Fok | .......................... | H04W 4/50 |
| | | | | 715/769 |
| 2007/0234226 A1* | 10/2007 | Szeto | .................... | G06F 3/0486 |
| | | | | 715/769 |
| 2012/0084694 A1* | 4/2012 | Sirpal | ................. | G06F 3/04883 |
| | | | | 715/769 |

(Continued)

*Primary Examiner* — Tadesse Hailu
(74) *Attorney, Agent, or Firm* — Hodgson Russ LLP

(57) ABSTRACT

A file processing method, a terminal, and a storage medium are provided, relating to the technical field of human-computer interaction. The method includes the following. A first user interface is displayed in the first display region and a second user interface is displayed in the second display region, when the foldable display screen is in an unfolded state, where the first display region and the second display region are on a same plane in the unfolded state. A drag operation on a target file in the first user interface is received. The target file is displayed in the second user interface according to the drag operation. The target file is processed through an application corresponding to the second user interface.

18 Claims, 9 Drawing Sheets

(56) References Cited

U.S. PATENT DOCUMENTS

| | | | |
|---|---|---|---|
| 2013/0321340 A1* | 12/2013 | Seo | G06F 3/04883 |
| | | | 345/174 |
| 2014/0096049 A1* | 4/2014 | Vonshak | G06F 3/0486 |
| | | | 715/769 |
| 2018/0335914 A1* | 11/2018 | Nilo | G06F 3/0412 |
| 2019/0042066 A1* | 2/2019 | Kim | G06F 3/1446 |
| 2019/0129596 A1* | 5/2019 | Ligameri | G06F 1/1647 |
| 2020/0192863 A1* | 6/2020 | Stratman | G06F 3/04845 |

* cited by examiner

FILE PROCESSING METHOD, TERMINAL, AND STORAGE MEDIUM

CROSS-REFERENCE TO RELATED APPLICATION(S)

This application is a continuation of U.S. application Ser. No. 17/375,891, filed on Jul. 14, 2021, which is a continuation of International Application No. PCT/CN2020/071654, filed on Jan. 13, 2020, which claims priority to Chinese Patent Application No. 201910036779.5, filed Jan. 15, 2019, the entire disclosures of which are incorporated herein by reference.

TECHNICAL FIELD

This disclosure relates to the technical field of human-computer interaction, and particularly to a file processing method, a terminal, and a storage medium.

BACKGROUND

In daily use of a terminal, users often need to process files across applications (apps). For example, share pictures in an album application to friends through a social application.

When processing files across applications, the user first needs to select a file to-be-processed from a current application and then selects another application for processing the file to-be-processed. Thereafter, the terminal jumps to display the selected another application, facilitating the user to process the file to-be-processed in the selected another application.

SUMMARY

A first user interface is displayed in the first display region and a second user interface is displayed in the second display region, when the foldable display screen is in an unfolded state, where the first display region and the second display region are on a same plane in the unfolded state. The first display region and the second display region are on a same plane in the unfolded state. The second application is selected from a third user interface displayed in the second display region, the third user interface is displayed in the second display region in response to an operation, the third user interface contains at least one application icon, and the second user interface of an application corresponding to a selected application icon is displayed in the second display region, when a selection operation on an application icon in the third user interface is received. A drag operation on a target file in the first user interface is received. The target file is displayed in the second user interface according to the drag operation. The target file is processed through an application corresponding to the second user interface.

According to another aspect, implementations provide a terminal. The terminal includes a foldable display screen, at least one processor, and a memory. The foldable display screen includes a first display region and a second display region. The memory is coupled to the at least one processor and stores at least one computer executable instruction thereon which, when executed by the at least one processor, causes the at least one processor to execute the method of the above aspect.

According to another aspect, implementations provide a non-transitory computer readable storage medium. The non-transitory computer readable storage medium is configured to store a computer program which, when executed by a processor, causes the processor to execute the method of the above aspect.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

To make objectives, technical solutions, and advantages of this application clearer, implementations of the application will be described in further detail below with reference to the accompanying drawings.

Figure 1:
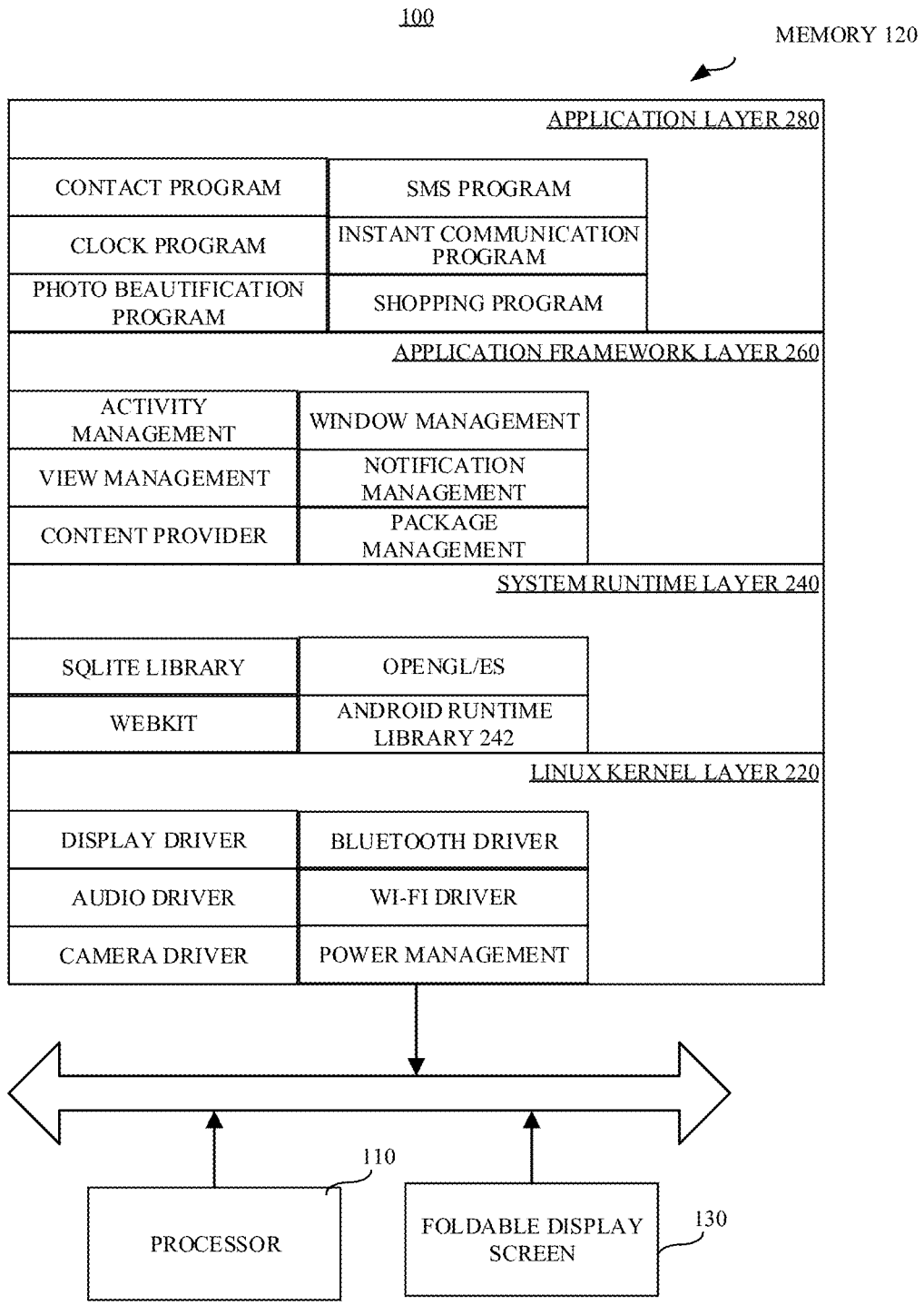
FIGS. 1 and 2 each illustrate a structural block diagram of a terminal according to implementations.
Figure 2:
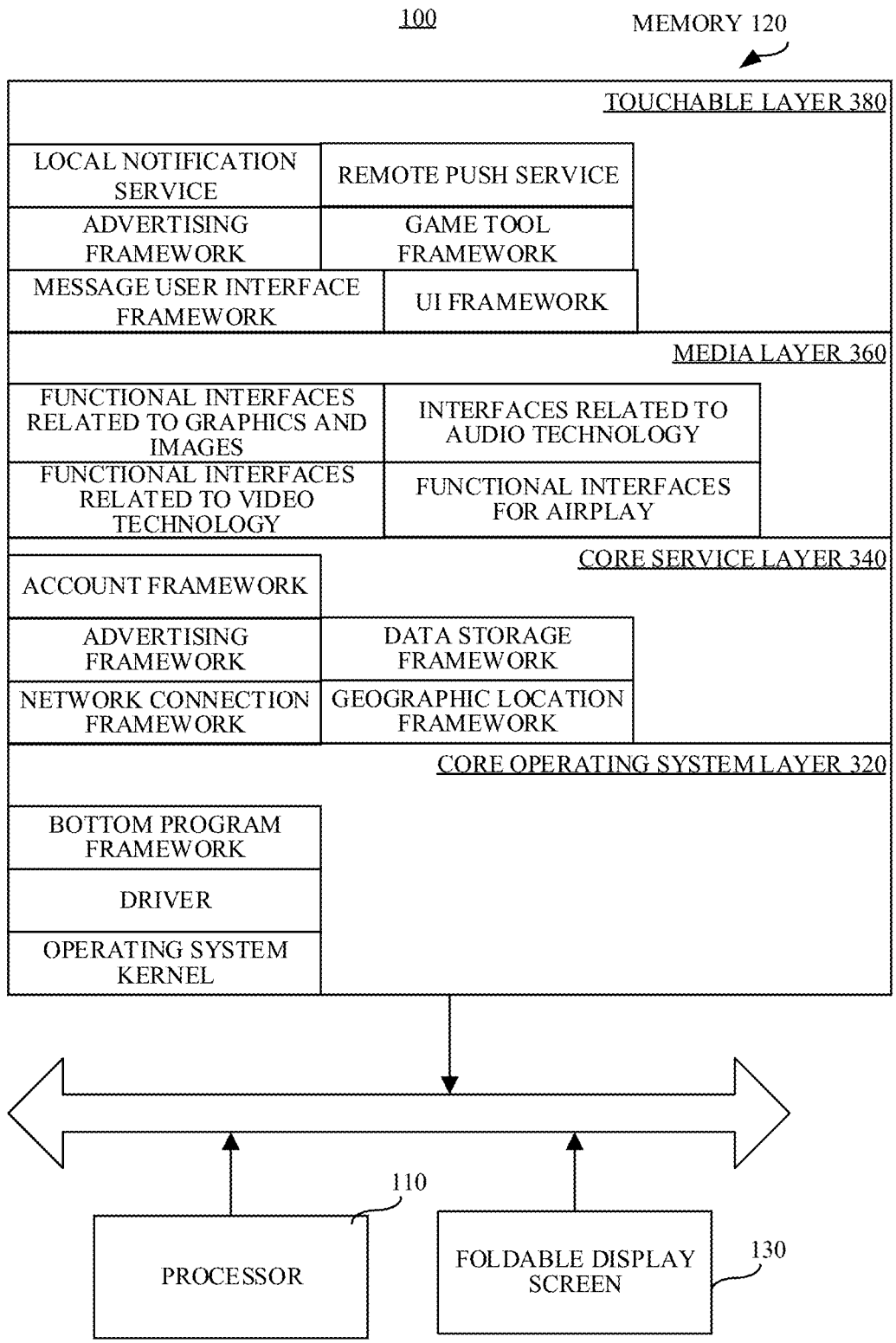

FIGS. 1 and 2 each illustrate a structural block diagram of a terminal 100 according to implementations. The terminal 100 may be a smart phone, a tablet computer, an e-book, or the like. The terminal 100 may include one or more of the following components: a processor 110, a memory 120, and a foldable display screen 130.

The processor 110 may include one or more processing cores. The processor 110 is configured to connect various parts of the entire terminal 100 by using various interfaces and lines, execute or perform the instructions, programs, code sets, or instruction sets stored in the memory 120, and deploy the data stored in the memory 120, to execute various functions and processing data of terminal 100. In an example, the processor 110 may use at least one hardware form of digital signal processing (DSP), field-programmable gate array (FPGA), and programmable logic array (PLA) to implement. The processor 110 may integrate one or a combination of a central processing unit (CPU), a graphics processing unit (GPU), and a modem. The CPU is mainly configured to handle the operating system, user interfaces, and applications; the GPU is used for rendering and drawing the content to be displayed by the foldable display screen 130; and the modem is used for processing wireless communication. It can be understood that the modem may not be integrated into the processor 110, and may be implemented by a single chip.

The memory 120 may include random access memory (RAM), and may also include read-only memory (ROM). In an example, the memory 120 includes a non-transitory computer-readable storage medium. The memory 120 may be used to store instructions, programs, codes, code sets, or instruction sets. The memory 120 may include a storage program region and a storage data region, where the storage program region may store instructions for implementing an operating system, instructions for at least one function (such as a touch function, a sound playback function, an image playback function, etc.), and instructions for implementing the following method implementations; the storage data region may store data (such as audio data, phone book) created according to the use of terminal 100.

Taking the operating system of an Android system as an example, the programs and data stored in the memory 120 are illustrated in FIG. 1. The memory 120 stores a Linux kernel layer 220, a system runtime layer 240, an application framework layer 260, and an application layer 280. The Linus kernel layer 220 provides underlying drivers for various hardware of the terminal 100, such as display drivers, audio drivers, camera drivers, Bluetooth drivers, Wi-Fi (wireless-fidelity) drivers, power management, and so on. The system runtime layer 240 provides major feature support for the Android system through some C/C++ libraries. For example, the SQLite library provides support for database, the OpenGL/ES library provides support for 3D drawing, and the Webkit library provides support for browser kernel. The Android runtime library 242 is also provided in the system runtime layer 240, which mainly provides some core libraries for allowing developers to write Android applications using the Java language. The application framework layer 260 provides various APIs that may be used when building applications. Developers can also use these APIs to build their own applications, such as activity management, window management, view management, notification management, content providers, package management, call management, resource management, and location management. There is at least one application running in the application layer 280. These applications can be contact programs, SMS programs, clock programs, camera applications, etc. that are native to the operating system; they can also be applications developed by third-party developers, such as instant communication programs, photo beautification programs, etc.

Taking the operating system of an IOS system as an example, the programs and data stored in the memory 120 are illustrated in FIG. 2. The IOS system includes: a core operating system layer 320, a core service layer 340, a media layer 360, and a touchable layer (also called Cocoa touch layer) 380. The core operating system layer 320 includes an operating system kernel, drivers, and underlying program frameworks. These underlying program frameworks provide functions closer to the hardware for use by the program framework located at the core service layer 340. The core service layer 340 provides system services and/or program frameworks required by applications, such as a foundation framework, an account framework, an advertising framework, a data storage framework, a network connection framework, a geographic location framework, a motion framework, and so on. The media layer 360 provides audio-visual-related interfaces for applications, such as interfaces related to graphics and images, interfaces related to audio technology, interfaces related to video technology, and Air-Play interfaces for audio and video transmission technologies. The touchable layer 380 provides various commonly-used interface-related frameworks for application development. The touchable layer 380 is used for user touch interactive operations on the terminal 100. For example, a local notification service, a remote push service, an advertising framework, a game tool framework, a message user interface (UI) framework, a user interface UIKit framework, a map framework, and so on.

Among the frameworks illustrated in FIG. 2, frameworks related to most applications include, but are not limited to: a basic framework in the core service layer 340 and a UIKit framework in the touchable layer 380. The basic framework provides many basic object classes and data types, and provides the most basic system services for all applications, regardless of the UI. The classes provided by the UIKit framework are basic UI class libraries for creating touch-based user interfaces. IOS applications can provide UI based on the UIKit framework, so it provides the infrastructure of applications for building user interfaces, drawing, handling and user interaction events, responding to gestures, and the like.

The foldable display screen 130 is a screen with a foldable function and is used to display user interfaces of various applications. The foldable display screen 130 is used to receive a touch operation thereon or nearby by a user using a finger, a touch pen, or any suitable object when the foldable display screen 130 also has a touch function.

Figure 3:
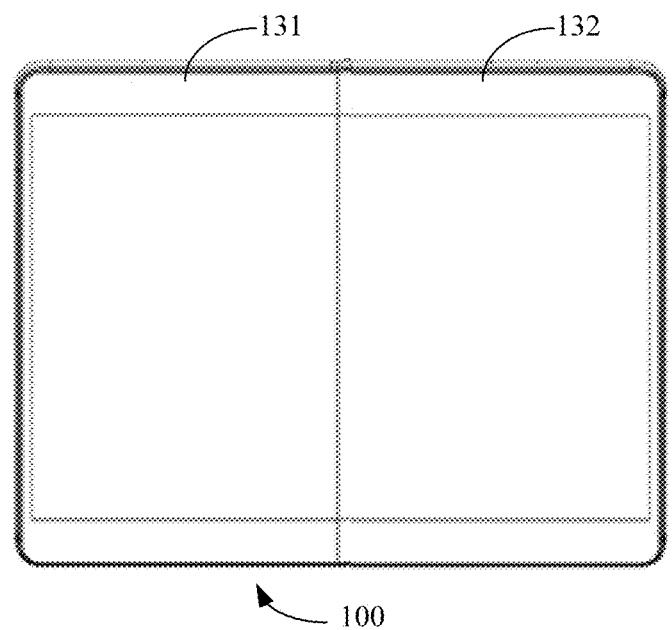
FIG. 3 is a schematic structural diagram illustrating a terminal in an unfolded state.

In an example, the foldable display screen 130 includes a first display region 131 and a second display region 132. In an unfolded state, as illustrated in FIG. 3, the first display region 131 and the second display region 132 are on a same plane. In a folded state, as illustrated in FIG. 4, the first display region 131 and the second display region 132 are on different planes.

It is noted that, the first display region 131 and the second display region 132 are used to distinguish different display regions of the foldable display screen 130, which still belong to the same foldable display screen 130 in nature.

In order to achieve folding of the display screen, in an implementation manner, the foldable display screen 130 is made of a flexible material (with certain scalability and ductility). Alternatively, a region connecting the first display region 131 and the second display region 132 is made of a flexible material.

Figure 4:
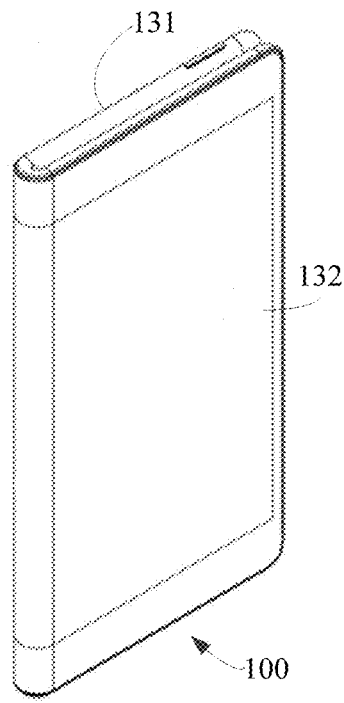
FIG. 4 is a schematic structural diagram illustrating a terminal in a folded state.

In FIG. 3 and FIG. 4, the terminal 100 has an outward foldable display screen (that is, the foldable display screen is exposed to the outside in the folded state), as an example for description. In another implementation manner, the terminal 100 has an inward foldable display screen (that is, the foldable display screen is not exposed to the outside in the folded state). For ease of presentation, in the following implementations, as an example for description, the terminal 100 has an external foldable display screen, which is not limited herein.

In FIGS. 3 and 4, the foldable display screen 130 includes two display regions, as an example for description. In other implementation manners, the foldable display screen 130 includes n (n≥3) display regions, so as to obtain a terminal with (n−1) foldable structures, which is not limited herein.

In an example, the terminal 100 is provided with at least one other component, where the at least one other component includes a camera, a fingerprint sensor, a proximity light sensor, a distance sensor, and the like. In some implementation manners, the at least one other component is disposed on the front, side, or back of the terminal 100, such as disposing the fingerprint sensor on the back cover or the side, and disposing the camera on one side of the foldable display screen 130.

In other implementation manners, the at least one other component is integrated inside or under the foldable display screen 130. In some implementation manners, a bone conduction earpiece is arranged inside the terminal 100; other components on the front panel of the related terminal are integrated in all or part of the foldable display screen 130. For example, after the photosensitive element in the camera is split into multiple photosensitive pixels, the pixels are integrated in a black region in each display pixel in the foldable display screen 130. As such, the foldable display screen 130 has an image acquisition function. Since the at least one other component is integrated inside or under the foldable display screen 130, the terminal 100 has a higher screen-to-body ratio.

In some implementation manners, a single side, or two sides (such as left and right sides), or four sides (such as top, bottom, left, and right sides) of the middle frame of the terminal 100 are provided with edge touch sensors. The edge touch sensors are used to detect at least one of a touch operation, click operation, press operation, and slide operation of the user on the middle frame. The edge touch sensor may be any one of: a touch sensor, a thermal sensor, and a pressure sensor. The user can apply operations on the edge touch sensor to control applications in the terminal 100.

In addition, those skill in the art can understand that the structure of the terminal 100 illustrated in the above figures does not constitute a limitation on the terminal 100. The terminal may include more or fewer components than illustrated in the drawings, or combine certain components, or different component arrangements. For example, the terminal 100 further includes components such as a radio frequency circuit, an input unit, an audio circuit, a Wi-Fi module, a power supply, and a Bluetooth module, and details are not repeated herein.

Figure 5:
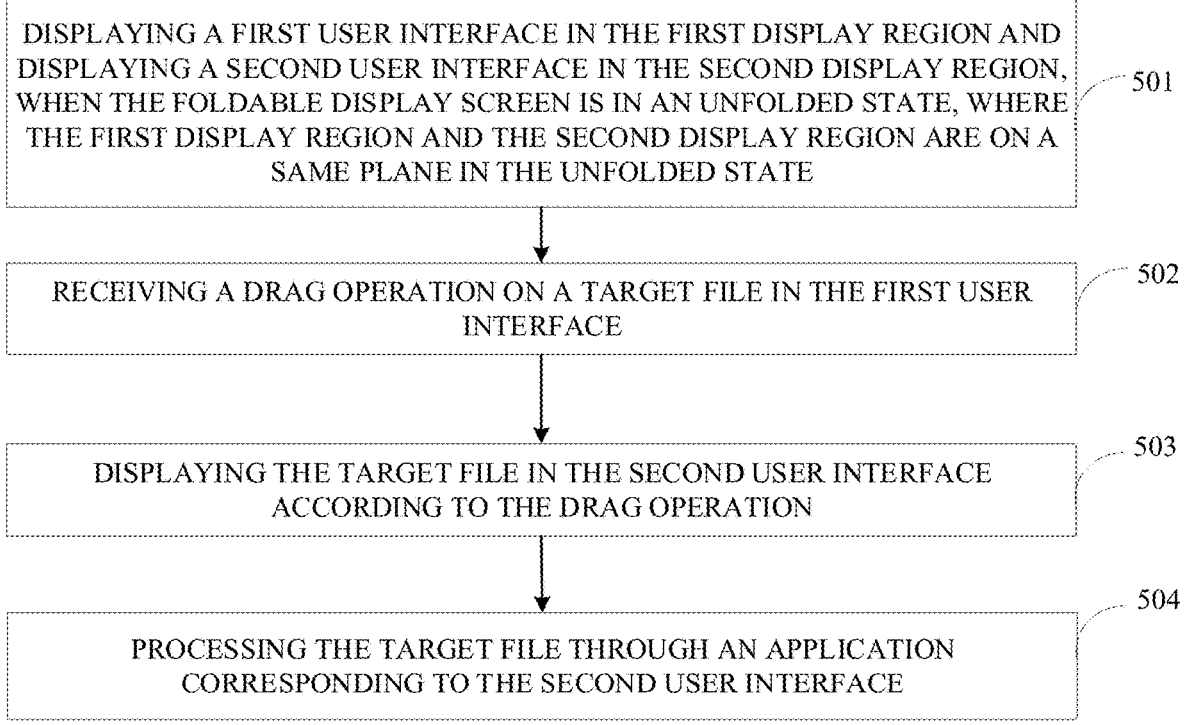
FIG. 5 is a schematic flow chart illustrating a file processing method according to implementations.

FIG. 5 is a schematic flow chart illustrating a file processing method according to implementations. In the implementation, the method is applied to the terminal of FIG. 1 or FIG. 2. The method begins at 501.

At 501, a first user interface is displayed in the first display region and a second user interface is displayed in the second display region, when the foldable display screen is in an unfolded state, where the first display region and the second display region are on a same plane in the unfolded state.

In an example, in the unfolded state, different display regions of the foldable display screen are used to display different user interfaces.

Figure 6:
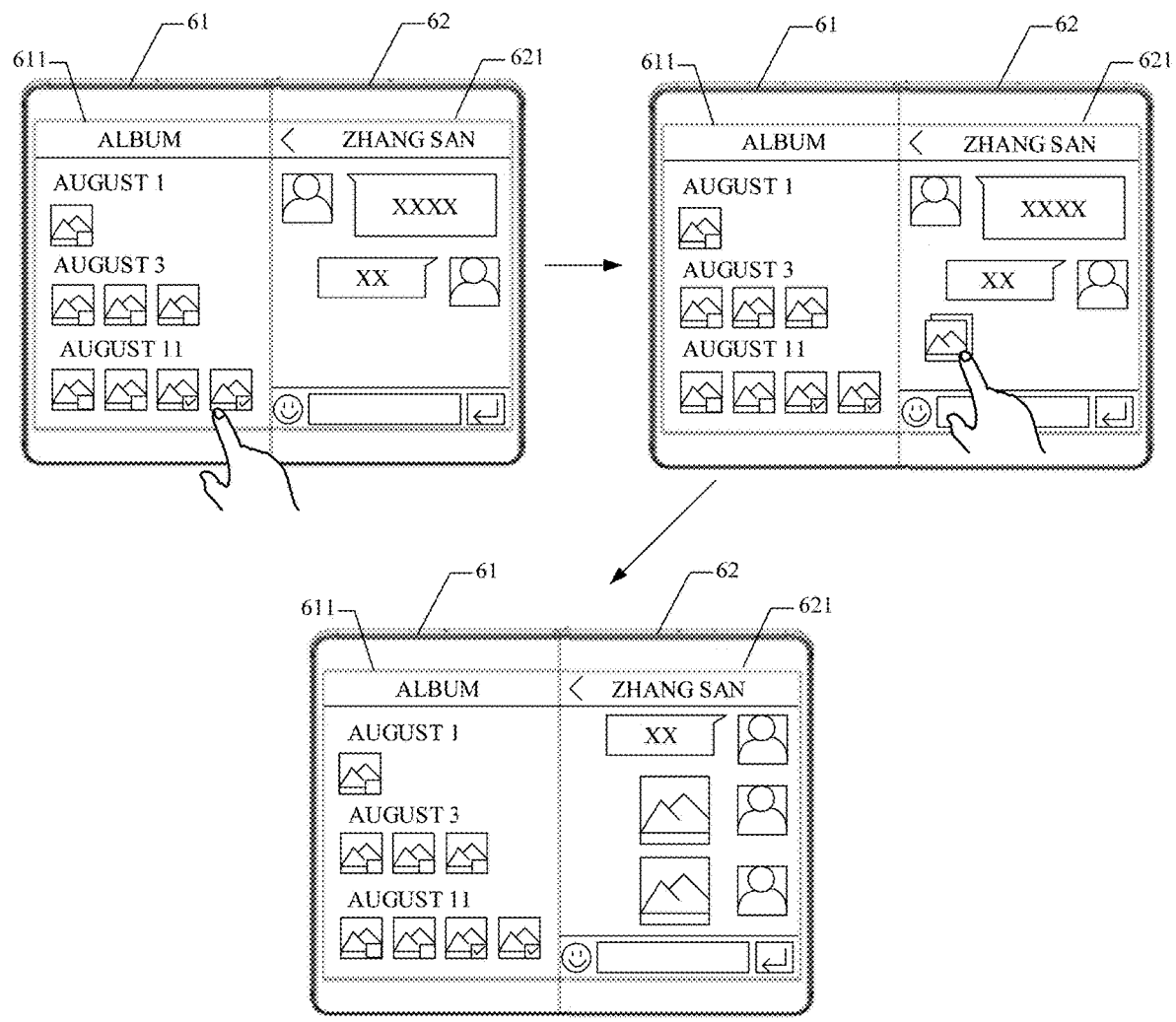
FIG. 6 is a schematic diagram illustrating an interface(s) involved in an implementation process of the file processing method in FIG. 5.

In an implementation manner, the first user interface and the second user interface are user interfaces of different applications. For example, as illustrated in FIG. 6, the first user interface 611 of an album application is displayed in the first display region 61, and the second user interface 621 of an instant messaging application is displayed in the second display region 62.

In another implementation manner, the first user interface and the second user interface are different user interfaces of the same application, where the application supports an application clone function. For example, the instant messaging application supports the application clone function, and the first display region and the second display region each display a user interface of the instant messaging application (logged in using different instant messaging accounts), where the first user interface is a chat interface with user A and the second user interface is a chat interface with user B.

In other implementation manners, for the first user interface and the second user interface, one is a user interface of an application and the other is an interface of the operating system. For example, the first user interface is a user interface of the instant messaging application and the second user interface is a main interface of the system (where application icons are displayed).

For the convenience of description, in the following implementations, the first user interface and the second user interface are user interfaces of different applications, which is not limited herein.

At 502, a drag operation on a target file in the first user interface is received.

In the related technology, after selecting a file(s), the user needs to select an application used for processing the file, and then the terminal jumps to the application used for processing the file. Different from the related technology, in the implementation of this application, since the first user interface (for file selection) and the second user interface (for file processing) are simultaneously displayed in the foldable display screen, to complete file transmission (or file transfer), the user merely needs to drag the target file.

In an example, the terminal receives a selection operation on at least one target file in the first user interface and further receives the drag operation on the target file. The files displayed in user interfaces of different applications have different file types.

For example, a file(s) displayed in a user interface of the album application is picture or video; a file(s) displayed in a user interface of a multimedia application is audio or video; a file(s) displayed in a text editing application is document; a file(s) displayed in a browser application is favorite web page; a file(s) displayed in a mail application is mail. This application is not limited thereto.

In an example, a start point of the drag operation is located in the first display region and an end point of the drag operation is located in the second display region. Alternatively, a drag direction of the drag operation is from the first display region to the second display region, and a drag speed is greater than a threshold speed (e.g., 400 pixels/sec).

As illustrated in FIG. 6, the user drags the selected pictures from the first display region 61 to the second display region 62.

At 503, the target file is displayed in the second user interface according to the drag operation.

According to the received drag operation, the terminal displays the target file in the second user interface, so that the user can process the target file in the second user interface.

In an implementation manner, a file identifier of the target file is displayed in the second user interface. If the target file is a picture, the file identifier is a thumbnail of the picture. If the target file is a video, audio, or mail, the file identifier includes a file name and a file icon.

At 504, the target file is processed through an application corresponding to the second user interface.

In an example, the terminal receives an operation of the user on the target file in the second user interface, and then processes the target file according to the received operation. Different applications have different processing manners for the target file, where the processing manners include at least one of opening, editing, sending, sharing, bookmarking, forwarding, and adding to attachments. For the processing manner for the target file, the implementations of this application are not limited.

In addition to processing the target file according to the received operation, in other implementation manners, the terminal directly processes the target file according to a predetermined processing manner. For example, the terminal, through the second application, directly sends the target file, directly opens the target file, or directly adds the target file as an attachment.

As illustrated in FIG. 6, after the user drags the selected pictures to the second display region 62, the terminal directly sends the selected pictures to a friend through the instant messaging application (where sending the target file is the predetermined processing manner).

In summary, in the implementation, when the foldable display screen is in the unfolded state, the terminal displays the first user interface in the first display region and displays the second user interface in the second display region, and when the drag operation on the target file in the first user interface is received, the terminal displays the target file in the second user interface according to the drag operation, such that the terminal can process the target file in the second user interface. In the whole process of file processing, since the foldable display screen can display different user interfaces at the same time, merely through the drag operation of the user, the file transmission can be achieved, without jumping between interfaces, thereby improving efficiency of file processing across applications.

In at least one implementation, the target file is displayed in the second user interface according to the drag operation as follows.

An end point of the drag operation is determined. The target file is displayed in the second user interface in response to the end point being located in the second display region.

In at least one implementation, the first user interface is a user interface of a first application, the second user interface is a user interface of a second application, the target file is displayed in the second user interface as follows.

A file type of the target file is obtained. The target file is displayed in the second user interface if the file type is a file type that the second application is able to process.

In at least one implementation, the target file is displayed in the second user interface as follows.

A file path of the target file is sent to the second application through the first application. The target file in the file path is red through the second application, and the target file is displayed in the second user interface.

In at least one implementation, after obtaining the file type of the target file, the following is further conducted.

Reminder information is displayed in the second user interface if the file type is not the file type that the second application is able to process, where the reminder information is used for indicating that the second application is unable to process the target file.

In at least one implementation, when the foldable display screen is in the unfolded state, the first user interface is displayed in the first display region and the second user interface is displayed in the second display region as follows.

A third user interface is displayed in the second display region in response to a first operation, where the third user interface contains at least one application icon and the first operation refers to an operation that can change the foldable display screen from the folded state to the unfolded state.

A selection operation on an application icon in the third user interface is received.

The second user interface of an application corresponding to the selected application icon is displayed in the second display region.

In at least one implementation, when the foldable display screen is in the unfolded state, the first user interface is displayed in the first display region and the second user interface is displayed in the second display region as follows.

The first user interface is displayed in the first display region and the second display region when the foldable display screen is in the unfolded state.

A slide operation is received.

A third user interface is displayed in the second display region in response to the slide operation, where the third user interface contains at least one application icon.

A selection operation on an application icon in the third user interface is received.

The second user interface of an application corresponding to the selected application icon is displayed in the second display region.

In at least one implementation, the application corresponding to the selected application icon is associated with an application corresponding to the first user interface.

In at least one implementation, after determining the end point of the drag operation, the following is further conducted.

The application corresponding to the second user interface is determined in response to the end point being located in the second display region.

The target file is displayed in the second user interface in response to the application corresponding to the second user interface being a preset application, where the preset application is associated with an application corresponding to the first user interface.

The drag operation is ignored in response to the application corresponding to the second user interface being not the preset application.

In an application scenario, the user uses the terminal in the folded state to browse pictures in the album application (i.e., the first application), when there is a need to send a picture in the album application to an instant messaging friend, the terminal is switched to the unfolded state and the instant messaging application (i.e., the second application) is started, so that the picture can be dragged through the drag operation to the instant messaging application for sending. The following will be described in detail.

Figure 7:
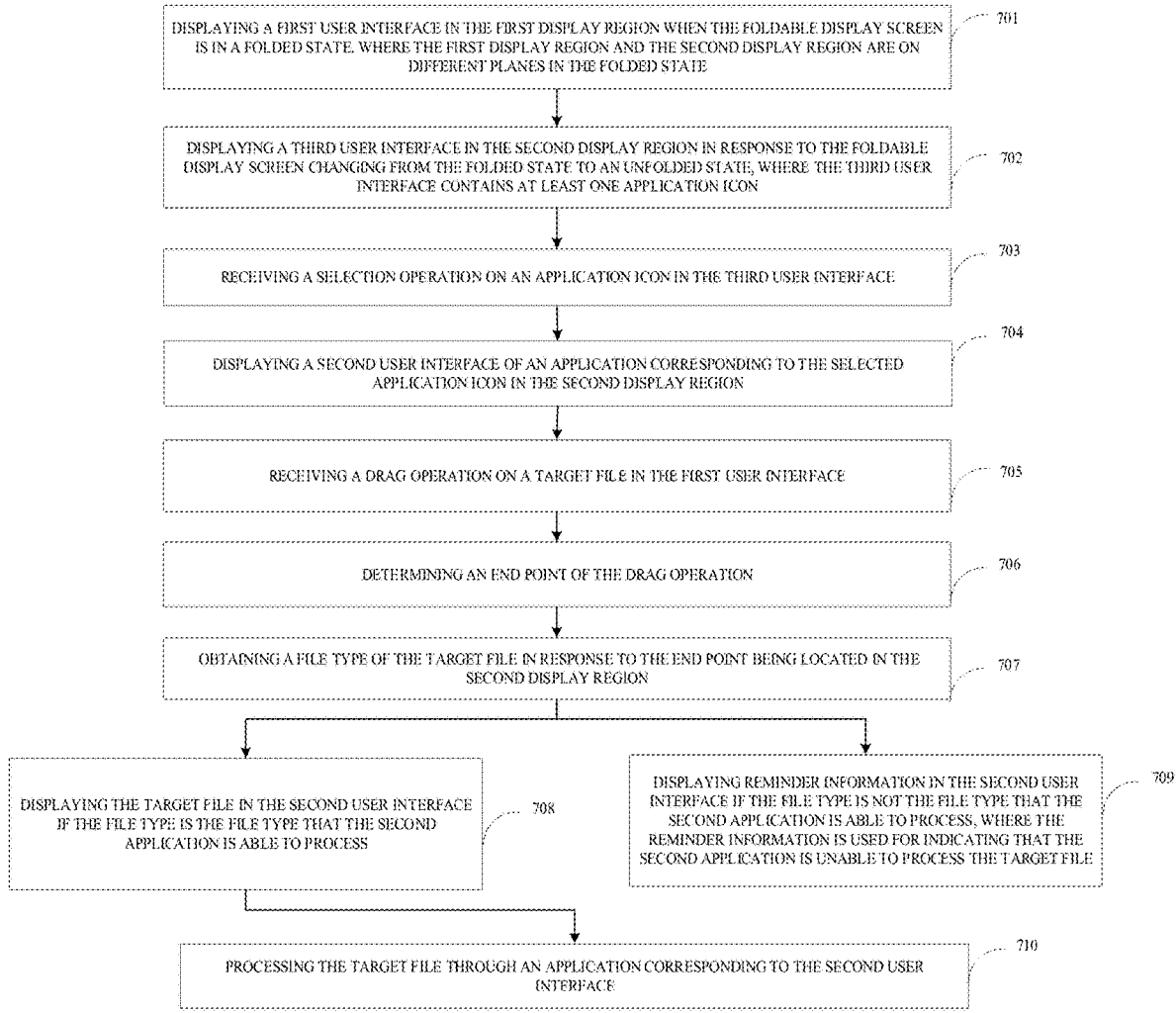
FIG. 7 is a schematic flow chart illustrating a file processing method according to other implementations.

FIG. 7 is a schematic flow chart illustrating a file processing method according to other implementations. In the implementation, the method is applied to the terminal of FIG. 1 or FIG. 2. The method begins at 701.

At 701, a first user interface is displayed in the first display region when the foldable display screen is in a folded state, where the first display region and the second display region are on different planes in the folded state.

In an implementation manner, in the folded state, the display region facing the user is in a screen-on state but the display region facing away from the user is in a screen-off state. In the implementation, the first display region is the display region facing the user in the folded state, and the terminal can determine the first display region according to sensor data (such as an angular velocity sensor, a light sensor, etc.). The implementation is not limited thereto.

Figure 8:
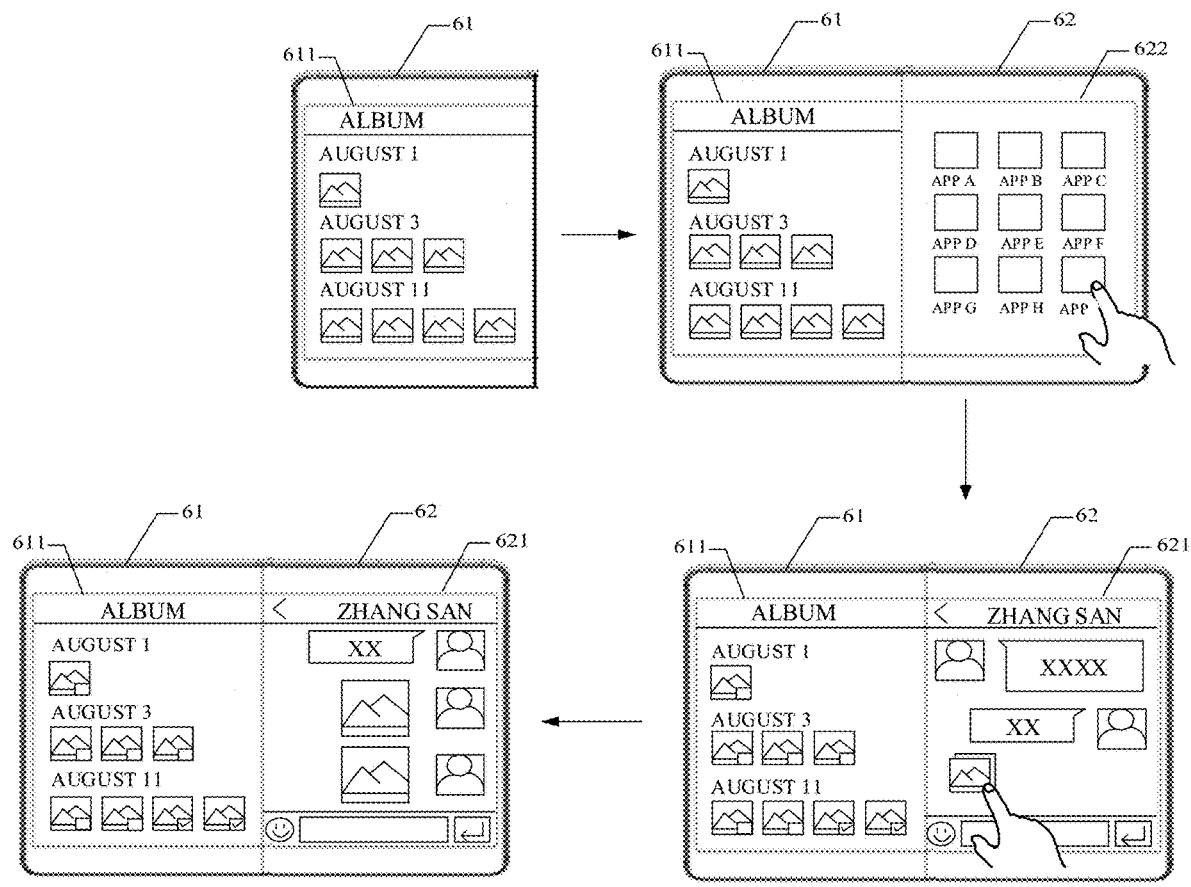
FIG. 8 is a schematic diagram illustrating an interface(s) involved in an implementation process of the file processing method in FIG. 7.

In an example, the first user interface is a user interface of the first application. As illustrated in FIG. 8, in the folded state, the first user interface 611 of the album application is displayed in the first display region 61.

At 702, a third user interface is displayed in the second display region in response to the foldable display screen changing from the folded state to an unfolded state, where the third user interface contains at least one application icon.

In an example, in the folded state, the terminal detects whether the state of the foldable display screen has been changed. If it is detected that the foldable display screen changes from the folded state to the unfolded state, the terminal displays the third user interface in the second display region, so that the user can select, from application icons displayed in the third user interface, an application corresponding to an application icon that needs to be displayed in the foldable display screen with the first application at the same time.

For displaying the applications in the third user interface, in an implementation manner, the terminal obtains applications associated with the first application (the application corresponding to the first user interface) based on an application association relationship, and displays application icons corresponding to the associated applications in the third user interface. In an example, the first application is the album application, and associated applications of the album application are an instant messaging application, an image editing application, a video editing application, and the like.

In an example, the application association relationship is generated based on previous (or historical) split-screen records, and the previous split-screen records are records of displaying different applications in the foldable display screen at the same time.

The third user interface may also contain other applications besides the associated applications, and display priorities of the associated applications are higher than that of other applications.

As illustrated in FIG. 8, when the foldable display screen changes from the folded state to the unfolded state, the terminal displays the third user interface 622 in the second display region 62, where the third user interface 622 contains application icons corresponding to several applications.

At 703, a selection operation on an application icon in the third user interface is received.

Furthermore, the terminal receives the selection operation on an application icon in the third user interface, so as to determine an application to be displayed in the second display region.

In an example, the selection operation on an application is a clicking operation on an application icon corresponding to the application.

At 704, a second user interface of an application corresponding to the selected application icon is displayed in the second display region.

According to the selection operation, the terminal stops displaying the third user interface in the second display region, but instead displays the second user interface of the application corresponding to the selected application icon. In the implementation, as an example for description, the second user interface is a user interface of the second application.

As illustrated in FIG. 8, after receiving the click operation of the user on the application icon, the terminal displays the second user interface 621 of the instant messaging application in the second display region 62.

In addition to displaying the application corresponding to the application icon selected by the user in the second display region, in other implementation manners, in the folded state, when a notification message is received, if the foldable display screen changes from the folded state to the unfolded state, for example, if it is detected, within a predetermined time interval (e.g., 1 minute) from when the notification message is received, that the foldable display screen changes from the folded state to the unfolded state, the terminal displays the second user interface of an application corresponding to the notification message in the second display region.

At 705, a drag operation on a target file in the first user interface is received.

For the implementation manner of this operation, reference can be made to the above operation 502, which will not be repeated herein.

At 706, an end point of the drag operation is determined.

To determine whether the drag operation on the target file is used for file transmission across applications, in an implementation manner, the terminal obtains the end point of the drag operation and detects whether the end point is located in the second display region. If the end point is located in the second display region, the method proceeds to operation 707. If the end point is not located in the second display region, the drag operation is responded through the first application (for example, adjusting a position of the target file in the first user interface).

In an example, the terminal obtains coordinates of the end point and detects whether there is an intersection between the coordinates of the end point and coordinates of the second display region, and if so, determines that the end point is located in the second display region.

In other implementation manners, when the drag operation used for trigging the file transmission across applications is an operation with a drag direction pointing from the first display region to the second display region and a drag speed greater than a threshold speed, the terminal determines whether to respond to the drag operation according to the drag direction and the drag speed, which is not limited herein.

At 707, a file type of the target file is obtained in response to the end point being located in the second display region.

When the end point is located in the second display region, it indicates that the drag operation is used for the file transmission across applications, and the terminal displays the target file in the second user interface according to the drag operation.

The second application is unable to process all types of files. For example, in the case that the target file is a video file and the second application is a text editing application, the text editing application is unable to process the video file. Therefore, in an implementation manner, before the target file is displayed in the second user interface (that is, before the file transmission across applications begins), the terminal obtains the file type of the target file and detects whether the file type of the target file is a file type that the second application is able to process. If so, the terminal performs operation 708; if not, the terminal performs operation 709.

In an example, the terminal stores a correspondence between applications and file types that they are able to process. For example, the correspondence is illustrated in Table 1.

TABLE 1

| | |
|---|---|
| XX chat | document, picture, video, audio |
| XX mailbox | document, picture, video, audio, email |

TABLE 1-continued

| | |
|---|---|
| XX beauty | image |
| XX document | document, picture |

The terminal determines whether the file type of the target file is the file type that the second application is able to process based on the correspondence.

In an example, when the target file is a picture and the second application is "XX chat", since the picture is a file type that "XX chat" is able to process, the terminal determines that "XX chat" can process the target file.

At 708, the target file is displayed in the second user interface if the file type is the file type that the second application is able to process.

When the file type is the file type that the second application is able to process, the terminal displays the target file in the second user interface, so that the target file can be processed by the user.

For displaying the target file in the second user interface, in an implementation manner, the terminal sends a file path of the target file to the second application through the first application, reads the target file in the file path through the second application, and then displays the read target file in the second user interface.

In addition to displaying the target file by way of data transmission between applications, in other implementation manners, the terminal obtains the file path of the target file in the first application through the operating system and send the file path to the second application, which is not limited herein.

At 709, reminder information is displayed in the second user interface if the file type is not the file type that the second application is able to process, where the reminder information is used for indicating that the second application is unable to process the target file.

When the second application is unable to process the target file, the terminal displays the reminder information in the second user interface through the second application, to remind the user that the second application is unable to process the target file, thereby avoiding inappropriate file transmission across applications.

In addition to detecting whether the second application is able to process the target file through the terminal, in other implementation manners, the terminal directly sends the file path of the target file to the second application through the first application, for the second application to determine whether it can process the target file during reading the target file according to the file path, which is not limited herein.

At 710, the target file is processed through an application corresponding to the second user interface.

For the implementation manner of this operation, reference can be made to the above operation 504, which will not be repeated herein.

In the implementation, when the foldable display screen is switched from the folded state to the unfolded state, the terminal displays several applications in the second display region for the user to select, then displays the second user interface of the second application in the second display region according to the user selection, and achieves the file transmission across applications according to the drag operation of the user on the target file in the first user interface, which improves efficiency of file processing across applications.

In addition, in the implementation, before displaying the target file in the second user interface, the terminal detects whether the second application is able to process the target file, and if not, the terminal displays the reminder information in the second user interface. Therefore, malfunction of the application due to transmitting the file that the second application is unable to process to the second application can be avoided.

In an example, in the foldable display screen, when a designated application is displayed in the foldable display screen with the first application at the same time, the terminal will respond to the drag operation on the target file. In an implementation manner, the terminal determines the end point of the drag operation, and if the end point is located in the second display region, the terminal determines the application corresponding to the second user interface and detects whether the target application is a preset application. The terminal displays the target file in the second user interface if the application corresponding to the second user interface is the preset application, where the preset application is associated with an application corresponding to the first user interface. The terminal ignores the drag operation if the application corresponding to the second user interface is not the preset application.

In an example, the terminal maintains an association relationship between applications, and the terminal determines whether the application corresponding to the first user interface is associated with the application corresponding to the second user interface based on the association relationship. For example, the association relationship is illustrated in Table 2.

TABLE 2

| application | associated application |
|---|---|
| XX album | XX beauty, XX chat |
| XX video | XX chat |
| XX text editor | XX chat, XX mail |

Figure 9:
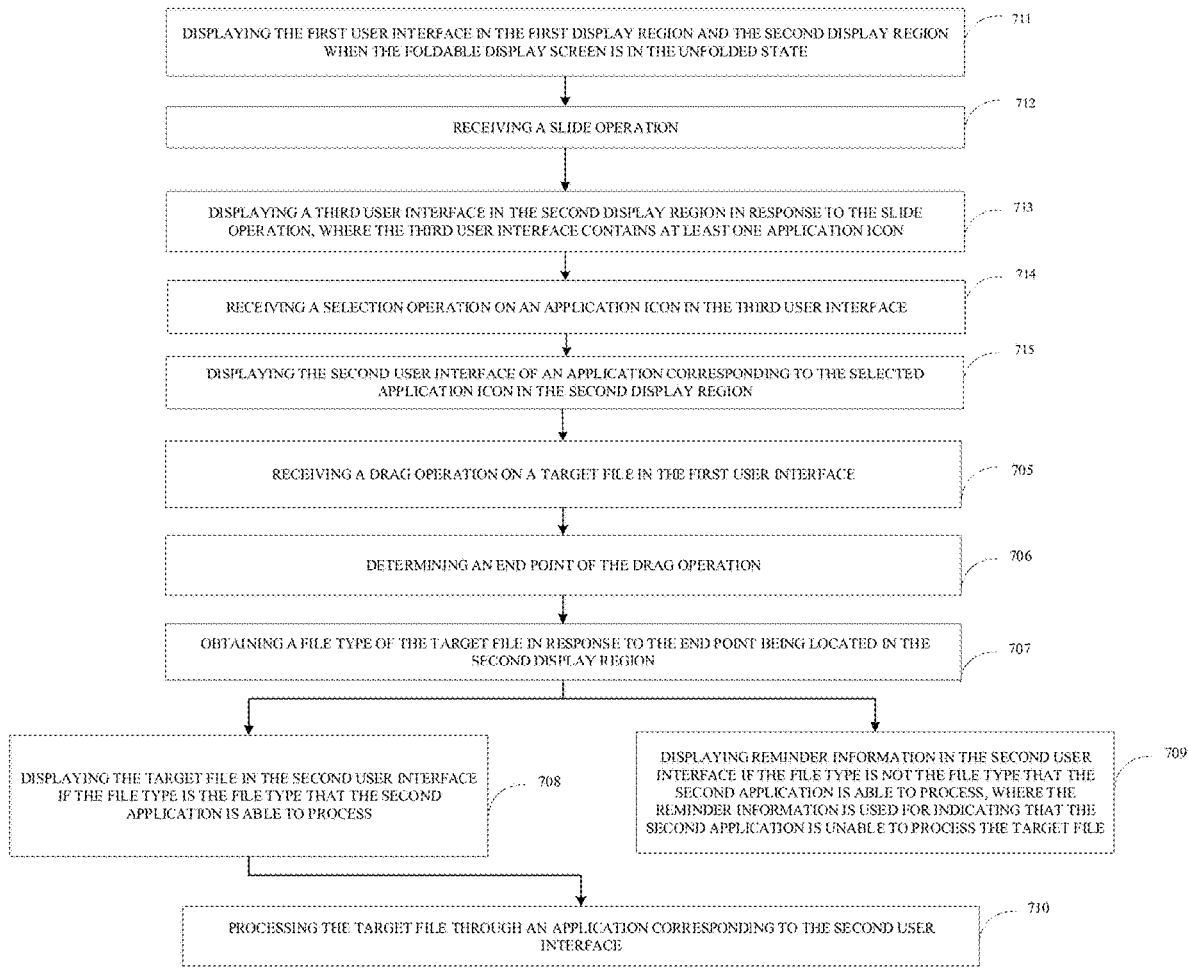
FIG. 9 is a schematic flow chart illustrating a file processing method according to other implementations.

In another application scenario, the user uses the terminal in the unfolded state to browse pictures in the album application (i.e., the first application) in full screen, when there is a need to send a picture in the album application to an instant messaging friend, the terminal is triggered to simultaneously display the album application and the instant messaging application (i.e., the second application) upon receiving a slide gesture (for example, for split-screen) of the user, so that the picture can be dragged through the drag operation to the instant messaging application for sending. Based on FIG. 7, as illustrated in FIG. 9, the above operations 701 to 704 can be replaced with the following operations.

At 711, the first user interface is displayed in the first display region and the second display region when the foldable display screen is in the unfolded state.

In the unfolded state, to achieve a better display effect, the terminal simultaneously displays the first user interface of the first application in the first display region and the second display region.

Figure 10:
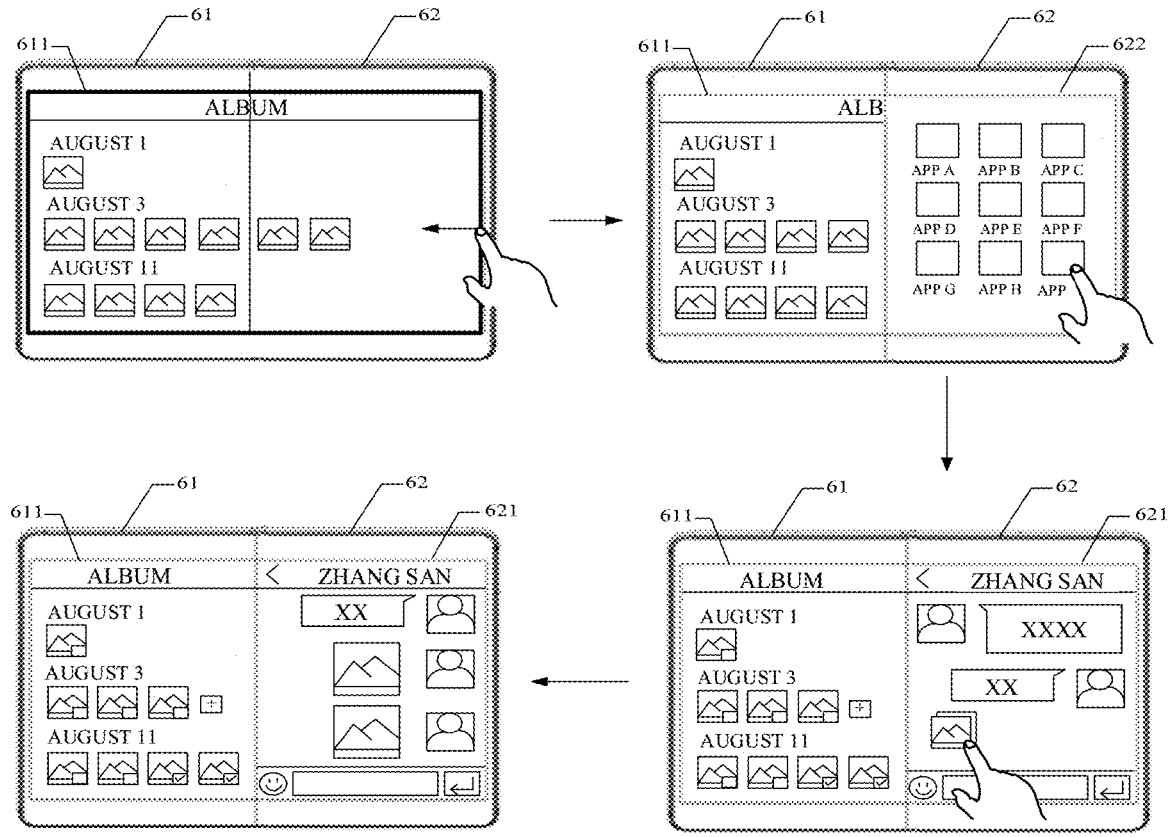
FIG. 10 is a schematic diagram illustrating an interface(s) involved in an implementation process of the file processing method in FIG. 9.

For example, as illustrated in FIG. 10, the terminal displays the first user interface 611 of the album application in both the first display region 61 and the second display region 62.

At 712, a slide operation is received.

In an implementation manner, the slide operation can be a slide operation at an edge of the foldable display screen, a start point of the slide operation is located at a predetermined edge of the foldable display screen, a sliding direction of the slide operation points to the center of the foldable display screen, and a sliding distance of the slide operation is greater than a threshold distance. For example, the predetermined edge is the left edge of the foldable display screen or the right edge of the foldable display screen.

For example, as illustrated in FIG. 10, when a slide operation on the right edge of the foldable display screen is received, the terminal determines that the slide operation is received.

In another implementation manner, the slide operation is a multi-finger swipe operation on the foldable display screen. For example, the slide operation is a three-finger swipe operation.

In addition to the foregoing two types of slide operations, the terminal can set and identify other types of slide operations, which is not limited herein.

At 713, a third user interface is displayed in the second display region in response to the slide operation, where the third user interface contains at least one application icon.

In an implementation manner, the terminal displays the third user interface above the first user interface according to the slide operation. In this case, the third user interface occludes the first user interface at the second display region.

For example, as illustrated in FIG. 10, the terminal displays the third user interface 622 in the second display region 62 according to the slide operation.

In another implementation manner, the terminal displays the first user interface in the first display region and displays the third user interface in the second display region according to the slide operation, avoiding occlusion to the first user interface.

For displaying applications in the third user interface, reference can be made to the above operation 702, which will not be repeated herein.

At 714, a selection operation on an application icon in the third user interface is received.

Furthermore, the terminal receives the selection operation of the user on the application icon in the third user interface. For the implementation manner of this operation, reference can be made to the above operation 703, which will not be repeated herein.

At 715, the second user interface of an application corresponding to the selected application icon is displayed in the second display region.

Furthermore, the terminal displays the second user interface of the application corresponding to the selected application icon in the second display region, and displays the first user interface previously displayed in the first display region and second display region in the first display region.

For example, as illustrated in FIG. 10, after the selection operation on the application icon in the third user interface 622 is received, the terminal displays the first user interface 611 in the first display region 61 and displays the second user interface 621 in the second display region 62.

In addition to displaying the application corresponding to the application icon selected by the user in the second display region, in other implementation manners, in the unfolded state, when a notification message is received, the terminal displays a banner notification corresponding to the notification message. When a click operation on the banner notification is received, the terminal directly displays in the second display region the second user interface of the second application to which the notification message belongs, which will not be repeated herein.

In the implementation, when the slide operation is received, the terminal displays several applications in the second display region, then displays the second user interface of the second application in the second display region according to the user selection, and achieves the file transmission across applications according to the drag operation of the user on the target file in the first user interface, which improves efficiency of file processing across applications.

The following are device implementations of this application, which can be used to implement method implementations of this application. For details not disclosed in the device implementations of this application, reference can be made to the method implementations of this application.

Figure 11:
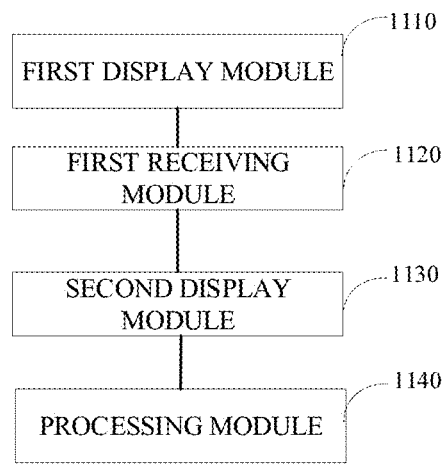
FIG. 11 is a structural block diagram illustrating a file processing device according to implementations.

FIG. 11 is a structural block diagram illustrating a file processing device according to implementations. The device is applied to the terminal of FIG. 1 or FIG. 2. The device includes a first display module 1110, a first receiving module 1120, a second display module 1130, and a processing module 1140.

The first display module 1110 is configured to display a first user interface in the first display region and display a second user interface in the second display region, when the foldable display screen is in an unfolded state, where the first display region and the second display region are on a same plane in the unfolded state.

The first receiving module 1120 is configured to receive a drag operation on a target file in the first user interface.

The second display module 1130 is configured to display the target file in the second user interface according to the drag operation.

The processing module 1140 is configured to process the target file through an application corresponding to the second user interface.

In at least one implementation, the second display module 1130 includes an obtaining unit and a file display unit.

The obtaining unit is configured to determine an end point of the drag operation.

The file display unit is configured to display the target file in the second user interface in response to the end point being located in the second display region.

In at least one implementation, the first user interface is a user interface of a first application, the second user interface is a user interface of a second application, and the file display unit is configured to: obtain a file type of the target file; and display the target file in the second user interface if the file type is a file type that the second application is able to process.

In at least one implementation, the file display unit is further configured to: send a file path of the target file to the second application through the first application; and read the target file in the file path through the second application, and display the target file in the second user interface.

In at least one implementation, the device further includes a reminder module.

The reminder module is configured to display reminder information in the second user interface if the file type is not the file type that the second application is able to process, where the reminder information is used for indicating that the second application is unable to process the target file.

In at least one implementation, the first display module 1110 includes a first display unit, a second display unit, a first receiving unit, and a third display unit.

The first display unit is configured to display the first user interface in the first display region when the foldable display screen is in a folded state, where the first display region and the second display region are on different planes in the folded state.

The second display unit is configured to display a third user interface in the second display region in response to the foldable display screen changing from the folded state to the unfolded state, where the third user interface contains at least one application icon.

The first receiving unit is configured to receive a selection operation on an application icon in the third user interface.

The third display unit is configured to display the second user interface of an application corresponding to the selected application icon in the second display region.

In at least one implementation, the first display module 1110 includes a fourth display unit, a second receiving unit, a fifth display unit, a third receiving unit, and a sixth display unit.

The fourth display unit is configured to display the first user interface in the first display region and the second display region when the foldable display screen is in the unfolded state.

The second receiving unit is configured to receive a slide operation.

The fifth display unit is configured to display a third user interface in the second display region in response to the slide operation, where the third user interface contains at least one application icon.

The third receiving unit is configured to receive a selection operation on an application icon in the third user interface.

The sixth display unit is configured to display the second user interface of an application corresponding to the selected application icon in the second display region.

In at least one implementation, the first display module 1110 includes a seventh display unit and an eighth display unit.

The seventh display unit is configured to display the first user interface in the first display region when the foldable display screen is in a folded state, where the first display region and the second display region are on different planes in the folded state.

The eighth display unit is configured to display the second user interface of an application corresponding to a notification message in the second display region in response to receiving the notification message and the foldable display screen changing from the folded state to the unfolded state.

In at least one implementation, the device further includes an obtaining module and an ignoring module.

The obtaining module is configured to determine the application corresponding to the second user interface in response to the end point being located in the second display region.

The second display module 1130 is further configured to display the target file in the second user interface in response to the application corresponding to the second user interface being a preset application, where the preset application is associated with an application corresponding to the first user interface.

The ignoring module is configured to ignore the drag operation in response to the application corresponding to the second user interface being not the preset application.

In summary, in the implementation, when the foldable display screen is in the unfolded state, the terminal displays the first user interface in the first display region and displays the second user interface in the second display region, and when the drag operation on the target file in the first user interface is received, the terminal displays the target file in the second user interface according to the drag operation, such that the terminal can process the target file in the second user interface. In the whole process of file processing, since the foldable display screen can display different user interfaces at the same time, merely through the drag operation of the user, file transmission can be achieved, without jumping between interfaces, thereby improving efficiency of file processing across applications.

Implementations further provide a non-transitory computer-readable storage medium. The non-transitory computer-readable storage medium stores at least one instruction (such as a computer program). When loaded and executed by a processor, the at least one instruction is configured to implement the file processing method of the above implementations.

Implementations further provide a computer program product. The computer program product stores at least one instruction. When loaded and executed by a processor, the at least one instruction is configured to implement the file processing method of the above implementations.

The above serial numbers of the implementations are merely for description and do not represent advantages and disadvantages of the implementations.

Those of ordinary skill in the art can understand that all or part of the operations in the foregoing implementations can be achieved by hardware or by a program instructing related hardware. The program can be stored in a computer-readable storage medium. The storage medium may be a read-only memory, a magnetic disk, or an optical disk, etc.

The above is some implementations of this application and is not intended to limit this application. Any modification, equivalent substitute, improvement, and the like, made within the spirit and principle of this application shall be included in the protection scope of this application.

What is claimed is:

1. A file processing method, implemented in a terminal with a foldable display screen comprising a first display region and a second display region, the method comprising:
    displaying a first user interface of a first application in the first display region and displaying a second user interface of a second application in the second display region, when the foldable display screen is in an unfolded state, wherein the first display region and the second display region are on a same plane in the unfolded state; wherein the second application is selected from a third user interface displayed in the second display region, the third user interface is displayed in the second display region in response to an operation, the third user interface contains at least one application icon, and the second user interface of an application corresponding to a selected application icon is displayed in the second display region, when a selection operation on an application icon in the third user interface is received;
    receiving a drag operation on a target file in the first user interface;
    displaying the target file in the second user interface according to the drag operation; and
    processing the target file through an application corresponding to the second user interface;
    wherein displaying the target file in the second user interface comprises:
        obtaining a file type of the target file; and
        displaying the target file in the second user interface if the file type is a file type that the second application is able to process.

2. The method of claim 1, wherein displaying the target file in the second user interface according to the drag operation comprises:
    determining an end point of the drag operation; and displaying the target file in the second user interface in response to the end point being located in the second display region.

3. The method of claim 2, further comprising:
after determining the end point of the drag operation,
determining the application corresponding to the second user interface if the end point being located in the second display region;
displaying the target file in the second user interface when the application corresponding to the second user interface being a preset application, wherein the preset application is associated with an application corresponding to the first user interface; and
ignoring the drag operation in response to the application corresponding to the second user interface being not the preset application.

4. The method of claim 1, wherein displaying the target file in the second user interface comprises:
sending a file path of the target file to the second application through the first application; and
reading the target file in the file path through the second application, and displaying the target file in the second user interface.

5. The method of claim 1, further comprising:
after obtaining the file type of the target file,
displaying reminder information in the second user interface if the file type is not the file type that the second application is able to process, wherein the reminder information is used for indicating that the second application is unable to process the target file.

6. The method of claim 1, wherein displaying the first user interface in the first display region and displaying the second user interface in the second display region, when the foldable display screen is in the unfolded state comprises:
displaying the third user interface in the second display region in response to a first operation, wherein the third user interface contains at least one application icon;
receiving a selection operation on an application icon in the third user interface; and
displaying the second user interface of an application corresponding to the selected application icon in the second display region.

7. The method of claim 1, wherein displaying the first user interface in the first display region and displaying the second user interface in the second display region, when the foldable display screen is in the unfolded state comprises:
displaying the first user interface in the first display region and the second display region when the foldable display screen is in the unfolded state;
receiving a slide operation;
displaying the third user interface in the second display region in response to the slide operation, wherein the third user interface contains at least one application icon;
receiving a selection operation on an application icon in the third user interface; and
displaying the second user interface of an application corresponding to the selected application icon in the second display region.

8. The method of claim 7, wherein the application corresponding to the selected application icon is associated with an application corresponding to the first user interface.

9. The method of claim 1, wherein displaying the first user interface in the first display region and displaying the second user interface in the second display region, when the foldable display screen is in the unfolded state comprises:
displaying the first user interface in the first display region when the foldable display screen is in a folded state, wherein the first display region and the second display region are on different planes in the folded state; and
displaying the second user interface of an application corresponding to a notification message in the second display region in response to receiving the notification message and the foldable display screen changing from the folded state to the unfolded state.

10. A terminal, comprising:
a foldable display screen comprising a first display region and a second display region;
at least one processor; and
a memory coupled to the at least one processor and storing at least one computer executable instruction thereon which, when executed by the at least one processor, causes the at least one processor to:
display a first user interface of a first application in the first display region and display a second user interface of a second application in the second display region, when the foldable display screen is in an unfolded state, wherein the first display region and the second display region are on a same plane in the unfolded state; wherein the second application is selected from a third user interface displayed in the second display region, the third user interface is displayed in the second display region in response to an operation, the third user interface contains at least one application icon, and the second user interface of an application corresponding to a selected application icon is displayed in the second display region, when a selection operation on an application icon in the third user interface is received;
receive a drag operation on a target file in the first user interface;
display the target file in the second user interface according to the drag operation; and
process the target file through an application corresponding to the second user interface;
wherein the at least one processor configured to display the target file in the second user interface is configured to:
obtain a file type of the target file; and
display the target file in the second user interface if the file type is a file type that the second application is able to process.

11. The terminal of claim 10, wherein the at least one processor configured to display the target file in the second user interface according to the drag operation is configured to:
determine an end point of the drag operation; and
display the target file in the second user interface in response to the end point being located in the second display region.

12. The terminal of claim 10, wherein the at least one processor configured to display the target file in the second user interface is configured to:
send a file path of the target file to the second application through the first application; and
read the target file in the file path through the second application, and display the target file in the second user interface.

13. The terminal of claim 10, wherein the at least one processor is further configured to:
display reminder information in the second user interface if the file type is not the file type that the second application is able to process, wherein the reminder information is used for indicating that the second application is unable to process the target file.

14. The terminal of claim 10, wherein the at least one processor configured to display the first user interface in the first display region and display the second user interface in the second display region is configured to:
    display the third user interface in the second display region in response to a first operation, wherein the third user interface contains at least one application icon;
    receive a selection operation on an application icon in the third user interface; and
    display the second user interface of an application corresponding to the selected application icon in the second display region.

15. The terminal of claim 10, wherein the at least one processor configured to display the first user interface in the first display region and display the second user interface in the second display region is configured to:
    display the first user interface in the first display region and the second display region when the foldable display screen is in the unfolded state;
    receive a slide operation;
    display the third user interface in the second display region in response to the slide operation, wherein the third user interface contains at least one application icon;
    receive a selection operation on an application icon in the third user interface; and
    display the second user interface of an application corresponding to the selected application icon in the second display region.

16. The terminal of claim 15, wherein the application corresponding to the selected application icon is associated with an application corresponding to the first user interface.

17. The terminal of claim 10, wherein the at least one processor configured to display the first user interface in the first display region and display the second user interface in the second display region is configured to:
    display the first user interface in the first display region when the foldable display screen is in a folded state, wherein the first display region and the second display region are on different planes in the folded state; and
    display the second user interface of an application corresponding to a notification message in the second display region in response to receiving the notification message and the foldable display screen changing from the folded state to the unfolded state.

18. A non-transitory computer readable storage medium storing a computer program which, when executed by a processor, causes the processor to:
    display a first user interface of a first application in a first display region of a foldable display screen of a terminal and display a second user interface of a second application in a second display region of the foldable display screen, when the foldable display screen is in an unfolded state, wherein the first display region and the second display region are on a same plane in the unfolded state; wherein the second application is selected from a third user interface displayed in the second display region, the third user interface is displayed in the second display region in response to an operation, the third user interface contains at least one application icon, and the second user interface of an application corresponding to a selected application icon is displayed in the second display region, when a selection operation on an application icon in the third user interface is received;
    receive a drag operation on a target file in the first user interface;
    display the target file in the second user interface according to the drag operation; and
    process the target file through an application corresponding to the second user interface;
    wherein the at least one processor caused to display the target file in the second user interface is caused to:
        obtain a file type of the target file; and
        display the target file in the second user interface if the file type is a file type that the second application is able to process.

* * * * *